United States Patent [19]

Piechnick

[11] Patent Number: 4,938,252

[45] Date of Patent: Jul. 3, 1990

[54] ELECTRICALLY ACTUATED VALVE, IN PARTICULAR THROTTLE VALVE

[75] Inventor: Martin Piechnick, Lohr/Main, Fed. Rep. of Germany

[73] Assignee: Mannesman Rexroth GmbH, Lohr/Main, Fed. Rep. of Germany

[21] Appl. No.: 353,009

[22] Filed: May 17, 1989

[30] Foreign Application Priority Data

May 26, 1988 [DE] Fed. Rep. of Germany ....... 3817932
Mar. 23, 1989 [DE] Fed. Rep. of Germany ....... 3909693

[51] Int. Cl.$^5$ ............................................. G05D 7/00
[52] U.S. Cl. ................................. 137/486; 137/487.5
[58] Field of Search ............................. 137/486, 487.5

[56] References Cited

U.S. PATENT DOCUMENTS

| | | | |
|---|---|---|---|
| 3,552,428 | 1/1971 | Pemberton | 137/486 |
| 4,146,051 | 3/1979 | Sparkes | 137/486 |
| 4,630,631 | 12/1986 | Barnes | 137/487.5 X |
| 4,761,681 | 8/1988 | Cuvy | 137/486 X |

Primary Examiner—Alan Cohan
Attorney, Agent, or Firm—Harness, Dickey & Pierce

[57] ABSTRACT

The invention relates to an electrically activated two-way throttle valve. The opening stroke of the valve piston is determined by an electrical desired value. To control the valve a circuit is provided to obtain a predetermined flow relation in response to the valve member position. According to the invention the pressure difference prevailing at the valve is measured. The pressure differential signal is exponentiated with an exponent. The product of this exponential function and of an input signal defines the desired value for the valve member position. By selecting different values for the exponent, the volume of flow in response to the valve member position is adjusted to an optimum and still further a variety of valve functions may be obtained to operate the valve as flow controlled or pressure controlled for example.

13 Claims, 4 Drawing Sheets

ELECTRICALLY ACTUATED VALVE, IN PARTICULAR THROTTLE VALVE

The invention relates to an electrically actuated valve in particular a throttle valve.

BACKGROUND OF THE INVENTION

According to German application P 25 23 600 an electrohydraulic control device is known in which the pressure difference between the inlet port and the outlet port of the valve is measured and in which the position of the valve member is adjusted by means of a control circuit such that the pressure difference responsive to load changes is compensated to make the flow independent of the prevailing pressure difference. To this end the root of the pressure difference is extracted in a control circuit and the desired value for the valve member stroke or, respectively the flow is divided by the extracted value. This output value defines the desired value for the valve stroke which is fed to a position control circuit.

SUMMARY OF THE INVENTION

It is an object of the present invention to provide a control means for a valve to obtain multiple valve functions in an economical way.

In particular it is an object to realize a volume control for a valve, further a pressure control, a power control or a restricting control for example.

A still further object is to provide different characteristics between the flow rate and the pressure difference, for example a characteristic progressive by square.

The improvements achieved by the present invention are obtained by an electrically activated valve, comprising a valve member, a displacement transducer for measuring the position of the valve member, a pressure transducer for measuring the pressure difference between the inlet port and outlet port of the valve and delivering a pressure differential signal, a transmitter circuit for delivering a signal corresponding to a flow position of said valve member, a control circuit for combining said pressure differential signal and said flow position signal and a position control circuit for actuating said valve, which position control circuit has an input to which said combining signal is applied.

According to a first aspect of the invention as claimed in claim 1 there is an exponentiating circuit for exponentiating said pressure differential signal with a freely selected exponent to generate an output signal and further a multiplying circuit for multiplying said output signal with said flow position signal.

According to a second aspect of the present invention as claimed in claim 5 an exponentiating circuit is provided for exponentiating said pressure differential signal with a freely selected exponent to generate an output signal and there is further provided a summing circuit for substracting the output signal of said exponential circuit and a signal which is the reciprocal value of said output signal times the valve member position signal.

According to the invention the signal corresponding to the pressure difference at the inlet port and the outlet port of the valve is exponentiated with an exponent. This exponent is selected such that the desired function between the flow volume and the valve stroke or, respectively the cross-sectional through-opening of the valve is obtained. The output signal of the exponentiating circuit is multiplied with the desired value for the valve member position and the product defines the desired value for the valve member stroke. Depending on selecting the exponent a variety of valve functions may be realized so that the valve may operate as a flow control valve, a power controlled valve or as a valve having a linear flow restriction. This is obtained by a control circuit according to claim 1.

The valve is operated as a pressure controlled valve when the control circuit is provided according to claim 5.

The valve according to the invention may be operated in either flow direction. To determine a desired flow a correcting factor is selected to be applied according to the direction of flow. Thus, the product of the output signal of the exponentiating circuit and the input signal for the desired value may be multiplied with the correcting factor.

According to a different embodiment the output signal of the summing circuit for the pressure control function of the valve is multiplied with the correcting factor.

Additional advantages and benefits of the present invention will become apparent upon reading of the description of the preferred embodiments taken in conjunction with the accompanying drawing.

DETAILED DESCRIPTION

Figure 1:
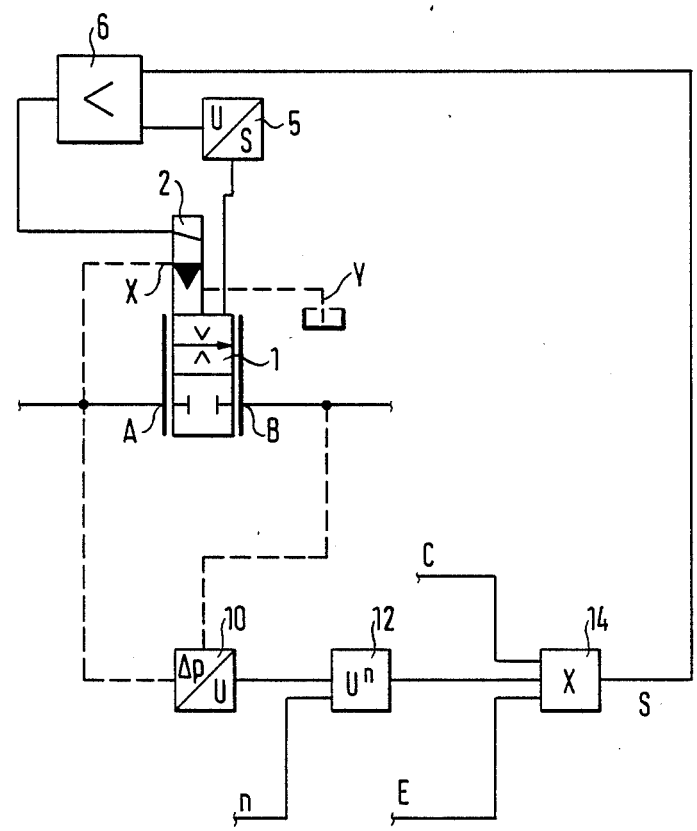
FIG. 1 shows a first embodiment of the invention.

FIG. 1 shows the graphic symbol of a throttle valve 1. The flow direction is from A to B. The position of the valve member is adjusted by a solenoid 2 including a pilot valve to generate a control pressure for actuating the valve piston of throttle valve 1. The inlet port for the control fluid is at x wherein the inlet port may be connected to the inlet port A of the valve working port as shown, while the return port y of the control fluid is connected to a reservoir.

The position of the valve piston member is picked up in a displacement transducer 5 which generates a voltage U corresponding to the valve member position. A control circuit 6 including an amplifier is provided to compare the desired value $S_{soll}$ for the valve member position and the actual value of the displacement transducer 5 to define an error signal to control the solenoid 2 which is defined by a proportional magnet. The circuit described is a position control circuit to obtain a defined correlation between the desired value and the actual value of the valve member position.

Assuming a rectangular cross-section of the valve opening, the flow relation between the volume of flow Q and the desired value for the valve piston stroke is as follows $$Q = B \cdot S_{soll} \Delta p^{0.5} \qquad [1]$$

wherein $\Delta p$ is the pressure difference between inlet port A and outlet port B of the throttle valve 1 and B is a flow correction value. The equation shows that the relation between the flow Q and the pressure difference $\Delta p$ is non-linear.

According to FIG. 1 the throttle valve including the position control circuit is supplemented by a further circuit. The throttle valve is supplemented with an additional differential pressure transducer 10 which is connected to both the working ports A and B of the throttle valve 1. The transducer 10 generates an electrical voltage according to the pressure difference. This voltage u is fed to an exponentiating circuit 12 to be exponentiated with an exponent n. The result $u^n$ is fed to a multiplying circuit 14 in which it is multiplied with an input signal $E_{soll}$ which is a desired value for the valve member position or, respectively the flow cross-section of the valve and with a correcting factor c. The output of the multiplying circuit 14 defines the desired value $S_{soll}$ for the valve piston stroke.

The desired value $S_{soll}$ results thus from the following equation.

$$S_{soll} = C \cdot E_{soll} \Delta p^n \quad [2]$$

Substituting the desired value Ssoll in equation [1] one obtains $$Q = B \cdot C \cdot E_{soll} \Delta p^{0.5+n} \quad [3]$$

The exponent $0.5+n$ allows to vary the characteristic between the flow volume and the pressure difference of the throttle valve. FIG. 1 shows that the exponentiating circuit 12 comprises a pair of input connections the first one receiving the pressure differential signal from the transducer 10 and the second receiving the value for the exponent $n$. A variety of valve functions may be realized by selecting the exponent $n$.

Substituting an exponent n=0.5 in equation [3] one obtains $$Q = B \cdot C \cdot E_{soll} \quad [4]$$

Figure 3:
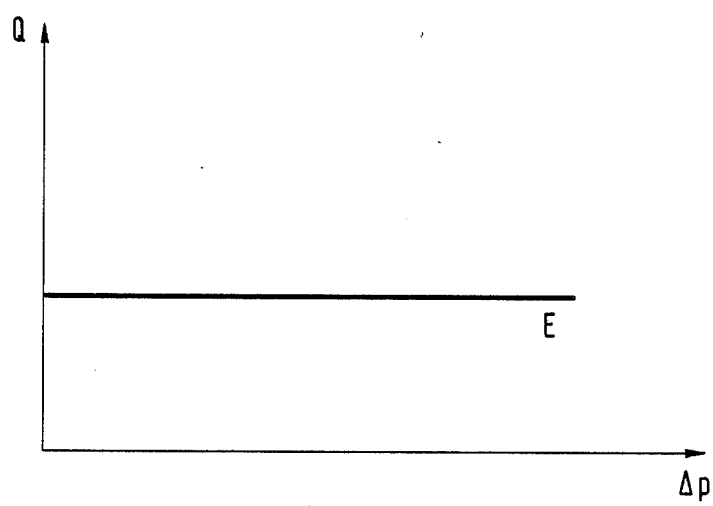
FIGS. 3 to 6 show characteristics of multiple valve functions.

The throttle valve operates as a flow control valve since the volume of flow does not depend anymore of the pressure difference prevailing at the throttle valve. As FIG. 3 shows, the characteristics for the desired valve position $E_{soll}$ extend parallel to the $\Delta p$ axis.

According to a further variation the exponent $n=0.5$ and substituting in equation [3] yields the following equation $$Q = B \cdot C \cdot E_{soll} \Delta p \quad [5]$$

Figure 4:
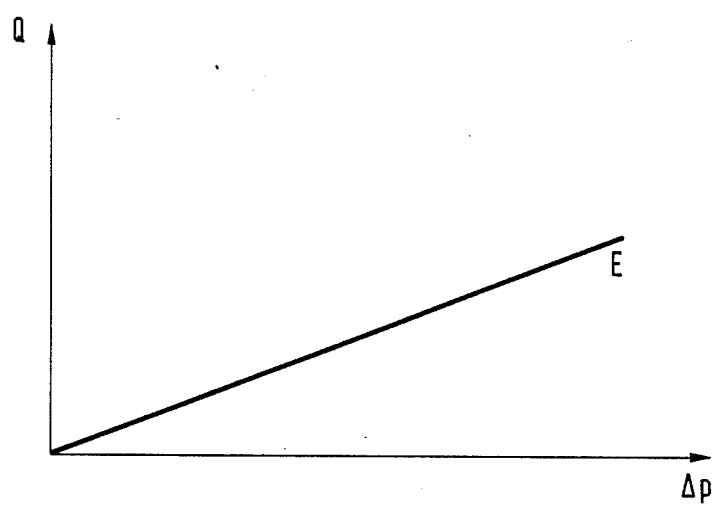

In this case the throttle valve operates as a linear restrictor, for example for dampening, wherein the linear function is obtained for the input signal $E_{soll}$ as well as for the pressure difference $\Delta p$ as FIG. 4 shows.

Further selecting the exponent $n=1.5$ the following equation is obtained $$Q \cdot \Delta p = B \cdot C \cdot E_{soll} \quad [6]$$

Figure 5:
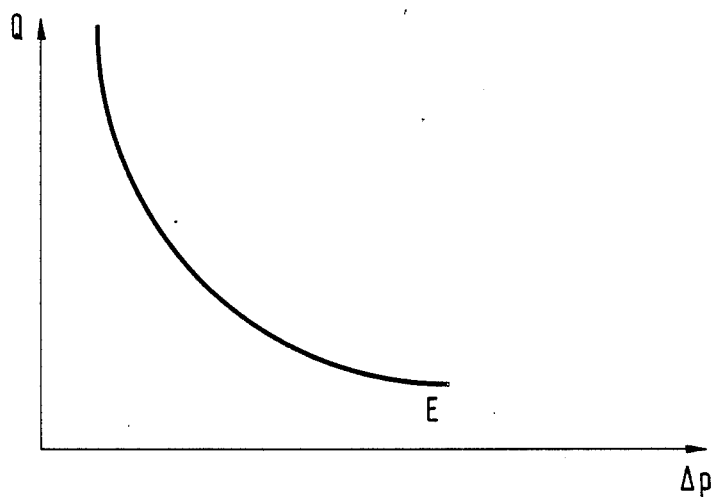

The valve operates power controlled since the product of flow volume and pressure difference is proportional to the input signal as shown in FIG. 5.

Different values for the exponent $n$ may be selected to determine a desired interrelation between flow volume Q and pressure difference $\Delta p$ within the power limits of the valve. Accordingly the flow relation may be optimized for different applications.

According to the invention the throttle valve embodies multiple valve functions which are nearly freely selectible by the user.

The previous description did not consider that the throttle valve has an idle stroke which means that the valve piston opens only after it travelled a predetermined idle stroke. To compensate for this idle stroke the input value $E_{soll}$ is correlated with a correcting factor.

It is further possible to use the throttle valve in either flow direction. For this a different flow coefficient is valid for one or the other flow direction so that different values of the correcting factor C are used to generate the desired value for the valve member position. Applying the proper factor C may take place in response to the sign of the pressure difference p.

Figure 2:
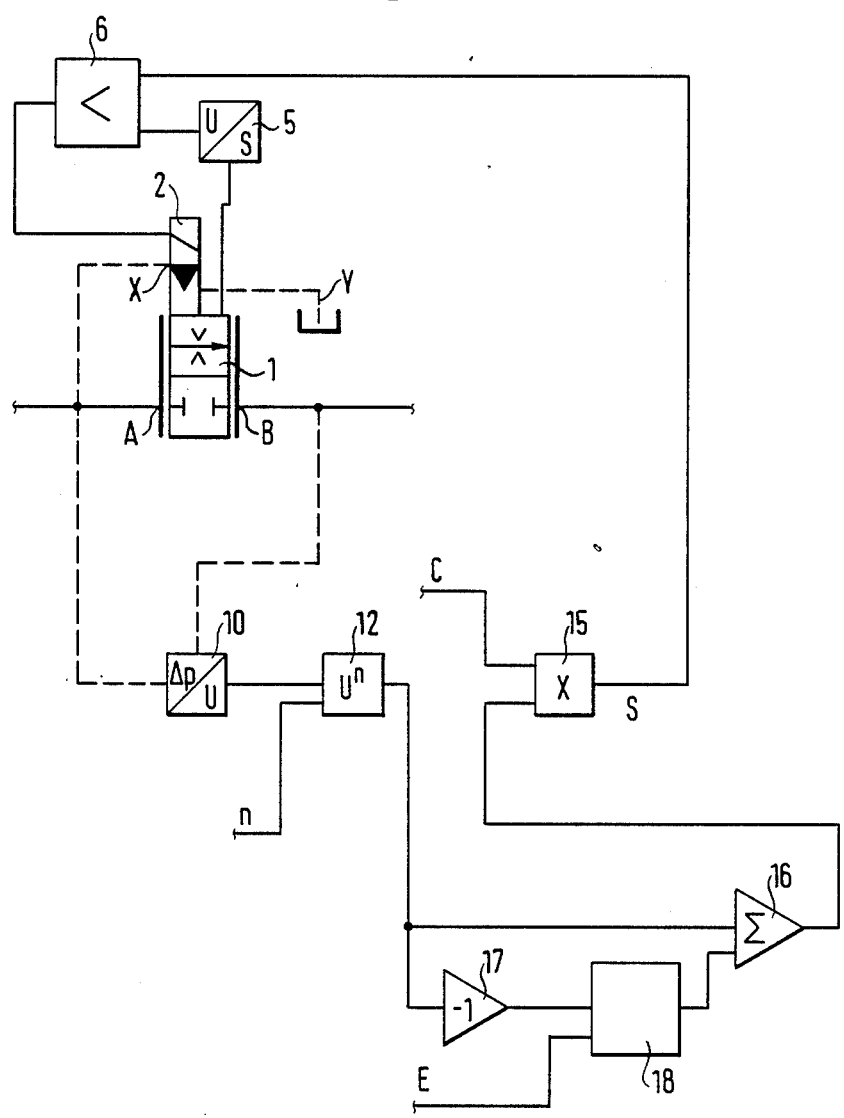
FIG. 2 shows a second embodiment of the invention.

According to the embodiment shown in FIG. 2 the output signal of the exponentiating circuit 12 is fed to a summing circuit 16 and through an inverter 17 to a dividing circuit 18. In the dividing circuit 18 the output signal is divided into the input signal $E_{soll}$. The output signal of the dividing circuit 18 is supplied to the summing circuit 16 to be subtracted from the output signal of the exponentiating circuit 12. The summing signal is supplied to the multiplying circuit 15 and multiplied with a correcting factor C. The output of the multiplying circuit 15 defines the desired value $S_{soll}$ for the valve piston stroke. This value $S_{soll}$ is obtained by the following equation $$S_{soll} = C \cdot \left( \Delta p^n - \frac{E_{soll}}{\Delta p^n} \right) \quad [7]$$

Substituting the desired value $S_{soll}$ in equation [1] one obtains $$Q = B \cdot C \left( \Delta p^n - \frac{E_{soll}}{\Delta p^n} \right) \Delta p^{0.5} \quad [8]$$

Again a variety of valve functions may be obtained by selecting various values of the exponent $n$.

For an exponent $n=0.5$ the flow through the valve is defined by $$Q = B \cdot C \cdot \Delta p - E \quad [9]$$

Figure 6:
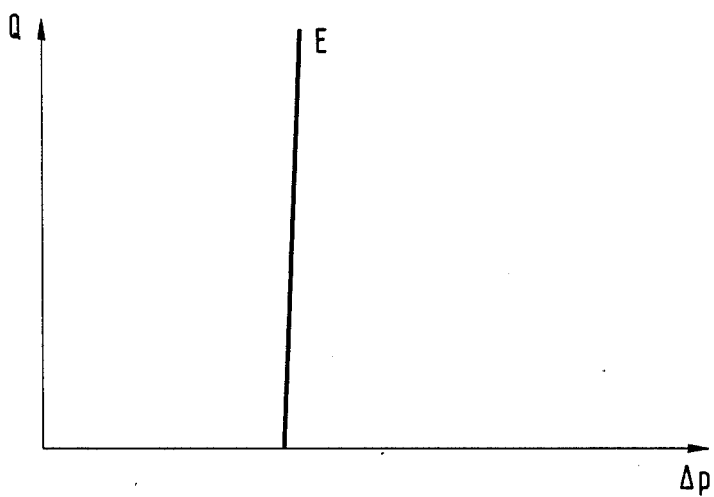

Accordingly the throttle valve operates as a pressure control valve provided the values of the correcting factor c are small since the characteristic for the flow Q and pressure difference $\Delta p$ resulting, extend substantially linear with respect to the Q axis and intersect the $\Delta p$ axis on the right hand side of the zero line, as FIG. 6 shows this for a certain value of $E_{soll}$.

The present invention is not limited to the throttle valve shown. Rather the present invention may be performed with different valves which are electrically controlled and include a restricting orifice or a control land for restricting the volume of flow therethrough. Valves having openings with non-linear cross-section may be provided with correcting means for meeting different geometrical relations. It is obvious to the artisan to perform the arithmetic calculations referred to above either analogue or digital.

What is claimed:

1. A circuit arrangement for controlling an electrically activated valve having a valve member regulating fluid flow between an inlet port and an outlet port, the circuit arrangement comprising:

a displacement transducer for measuring an actual position of the valve member;

a transmitter circuit for transmitting a position signal corresponding to the actual position of the valve member;

a pressure transducer for measuring a pressure difference between the inlet port and the outlet port and transmitting a pressure differential signal corresponding to the pressure difference;

an exponentiating circuit for exponentiating the pressure differential signal with a freely selected exponent n resulting in an exponentiating circuit output signal;

a multiplying circuit for multiplying the exponentiating circuit output signal with a value of a desired position of the valve resulting in a multiplying circuit output signal;

a control circuit for combining the position signal and the multiplying circuit output signal resulting in a control signal; and a position control means for repositioning the valve in response to the control signal.

2. The valve of claim 1, wherein said exponent is selected to be $n=-0.5$ for defining a flow control valve.

3. The valve of claim 1, wherein said exponent is selected to be $n=0.5$ for defining a full volume which is linearly dependent on said desired position of the valve and on said pressure difference.

4. The valve of claim 1, wherein said exponent is selected to be $n=-1.5$ for defining a power controlled valve.

5. The valve of claim 1, wherein the summing circuit output signal is multiplied with a correcting factor C.

6. The valve of claim 5, wherein the correcting factor C is different for either direction of flow.

7. The valve of claim 6, wherein the control signal is corrected by a constant value to compensate for the idle stroke of the valve member.

8. The valve of claim 1, wherein the control signal is corrected by a constant value to compensate for the idle stroke of the valve member.

9. A circuit arrangement for controlling an electrically activated valve having a valve member regulating fluid flow between an inlet port and an outlet port, the circuit arrangement comprising:

a displacement transducer for measuring an actual position of the valve member;

a transmitter circuit for transmitting a position signal corresponding to the actual position of the valve member;

a pressure transducer for measuring a pressure difference between the inlet port and the outlet port and transmitting a pressure differential signal corresponding to the pressure difference;

an exponentiating circuit for exponentiating the pressure differential signal with a freely selected exponent n resulting in an exponentiating circuit output signal;

an inverter and dividing circuit for dividing the exponentiating circuit output signal into a value of a desired position of the valve resulting in a dividing circuit output signal;

a summing circuit for subtracting the dividing circuit output signal from the exponentiating circuit output signal resulting in a summing circuit output signal;

a control circuit for combining the position signal and the summing circuit output signal resulting in a control signal; and a position control means for repositioning the valve in response to the control signal.

10. The valve of claim 9, wherein the summing circuit output signal is multiplied with a correcting factor C.

11. The valve of claim 10, wherein the correcting factor C is different for either direction of flow.

12. The valve of claim 11, wherein the control signal is corrected by a constant value to compensate for the idle stroke of the valve member.

13. The valve of claim 9, wherein the control signal is corrected by a constant value to compensate for the idle stroke of the valve member.

* * * * *